US008523983B2

(12) United States Patent
Loreth (10) Patent No.: US 8,523,983 B2
(45) Date of Patent: Sep. 3, 2013

(54) DEVICE IN CONNECTION WITH A CIRCULAR PRECIPITATOR FOR A TWO-STAGE ELECTROSTATIC FILTER

(75) Inventor: Andrzej Loreth, Akersberga (SE)

(73) Assignee: Eurus Airtech AB, Akersberga (SE)

( * ) Notice: Subject to any disclaimer, the term of this patent is extended or adjusted under 35 U.S.C. 154(b) by 0 days.

(21) Appl. No.: 13/393,899

(22) PCT Filed: Sep. 2, 2010

(86) PCT No.: PCT/SE2010/000213
§ 371 (c)(1),
(2), (4) Date: Mar. 2, 2012

(87) PCT Pub. No.: WO2011/028162
PCT Pub. Date: Mar. 10, 2011

(65) Prior Publication Data
US 2012/0152123 A1    Jun. 21, 2012

(30) Foreign Application Priority Data

Sep. 4, 2009 (SE) ...................................... 0901152
Jan. 22, 2010 (SE) ...................................... 1000063

(51) Int. Cl.
*B03C 3/80* (2006.01)
(52) U.S. Cl.
USPC ................. 96/39; 96/40; 96/43; 96/50; 96/94
(58) Field of Classification Search
USPC ................... 96/39, 40, 43, 50, 52, 94; 95/59, 95/74, 77; 55/DIG. 3
See application file for complete search history.

(56) References Cited

U.S. PATENT DOCUMENTS

| | | | | |
|---|---|---|---|---|
| 2,100,155 A | * | 11/1937 | Beran | 96/39 |
| 2,701,622 A | * | 2/1955 | Hodson | 96/50 |
| 2,738,027 A | * | 3/1956 | Winklepleck | 96/84 |
| 3,375,638 A | * | 4/1968 | Dungler | 96/39 |
| 3,401,503 A | * | 9/1968 | Bergstrom | 96/39 |
| 3,785,117 A | * | 1/1974 | Leith | 95/74 |
| 4,940,471 A | | 7/1990 | Penney | |
| 5,429,669 A | * | 7/1995 | Chang | 96/51 |

(Continued)

FOREIGN PATENT DOCUMENTS

| | | | |
|---|---|---|---|
| DE | 3841766 A1 * | 6/1990 | 96/39 |
| GB | 475443 | 11/1937 | |
| WO | 9746322 | 12/1997 | |

OTHER PUBLICATIONS

International Search Report dated Nov. 24, 2010, corresponding to PCT/SE2010/000213.

*Primary Examiner* — Richard L Chiesa
(74) *Attorney, Agent, or Firm* — Young & Thompson (57) ABSTRACT

A device in connection with a circular precipitator (1) for a two-stage electrostatic filter, wherein the precipitator (1) is formed of at least two strip-like electrode elements wound around a centrally arranged bobbin and the electrode elements are arranged at a distance "d" from one another so that gaps are formed between the electrode elements, wherein the device includes elements for rotating the precipitator (1) about its center axis and wherein a vacuum cleaner nozzle (27) is arranged on one side of the precipitator (1), the vacuum cleaner nozzle (27) being situated in the immediate vicinity of the precipitator (1). It is significant for the device that the vacuum cleaner nozzle (27) is provided with at least two elements (35/36) designed to penetrate into the gaps between adjacent electrode elements of the precipitator (1).

10 Claims, 7 Drawing Sheets

(56) References Cited

U.S. PATENT DOCUMENTS

| | | | |
|---|---|---|---|
| 6,203,600 B1 * | 3/2001 | Loreth | 96/40 |
| 6,663,695 B2 * | 12/2003 | Ike et al. | 96/52 |
| 6,958,088 B1 * | 10/2005 | Moriyama | 96/39 |
| 7,641,718 B2 * | 1/2010 | Furuta et al. | 96/39 |
| 2007/0295208 A1 * | 12/2007 | Fairchild | 95/74 |

* cited by examiner

DEVICE IN CONNECTION WITH A CIRCULAR PRECIPITATOR FOR A TWO-STAGE ELECTROSTATIC FILTER

TECHNICAL FIELD OF THE INVENTION

Device in connection with a circular precipitator for a two-stage electrostatic filter, wherein the precipitator is formed of at least two strip-like electrode elements wound around a centrally arranged bobbin and the electrode elements are arranged at a distance "d" from one another so that gaps are formed between the electrode elements, wherein the device includes means for rotating the precipitator about its centre axis and wherein a vacuum cleaner nozzle is arranged on one side of the precipitator, the vacuum cleaner nozzle being situated in the immediate vicinity of the precipitator.

STATE OF THE ART

Considerable focus in recent years on better indoor air quality in combination with better, i.e. more efficient, energy use has created an interest in particle filter technologies other than those based on the use of various fibres. One example of a technology of this kind is what is referred to as the two-stage electrostatic filter.

Recent developments in electrostatic filters have led to effective particle filter solutions with a much broader range of application based on the use of high-resistance material for the construction of what is referred to as the precipitator instead of using metallic electrode elements. Recent research into the use of traditional fibre filters has raised concerns about the dust collected in the filter and its effect on the air passing through the filter. One possible solution could be for a particle filter to be cleaned intermittently during operation so that at least the majority of the dust particles already collected would be removed from the filter.

A proposal for the intermittent cleaning of electrostatic filters is described in WO97/46322. This document describes a two-stage electrostatic filter with an ionisation section provided on the downstream side as viewed in the direction of the air flow through the device with what is referred to as a precipitator. The precipitator consists of two strip-like electrode elements wound several times around a bobbin with a spacing "d" between respective electrode elements. A precipitator of this kind forms an almost cylindrical body. Air flows through the precipitator in the axial direction and through the open gaps "d" formed between the adjacent strip-shaped electrode elements.

According to the aforementioned patent application, the dust collected on the inlet side of the precipitator is removed with the aid of a built-in vacuum cleaner. It describes how a vacuum cleaner nozzle is located radially and is directly connected to the inlet of the precipitator and how the nozzle is displaced relative to the precipitator with the vacuum cleaner on.

Laboratory tests have shown that although the abovementioned proposed solution for the effective removal of the dust collected does remove the dust from the inlet area of the precipitator, it is not effective when it comes to dust particles collected in the gaps between and on the respective electrode elements.

OBJECTS AND FEATURES OF THE INVENTION

A primary object of the present invention is to provide a device including a suitable embodiment of a vacuum cleaner nozzle designed to accommodate a circular precipitator of the type specified hereinabove.

Another object of the present invention is to integrate a blow nozzle into the device in one particular embodiment.

A further object of the present invention is to make the removal of the dust collected more efficient.

At least the primary object of the present invention is achieved by means of a device having the features defined in the adherent independent claim 1. Preferred embodiments of the invention are defined in the dependent claims.

BRIEF DESCRIPTION OF THE DRAWINGS

Preferred embodiments of the device according to the present invention will now be described with reference to the accompanying drawings, in which.

DETAILED DESCRIPTION OF PREFERRED EMBODIMENTS OF THE INVENTION

Laboratory tests have shown that the dust particles collected on the electrode elements are difficult to remove solely with the aid of the relatively powerful air flow provided by a vacuum cleaner nozzle in the immediate vicinity of the inlet surface of the precipitator.

According to the present invention, the vacuum cleaner nozzle is provided with elements which can penetrate into adjacent gaps between the electrode elements of the precipitator when the precipitator is displaced relative to the nozzle. One suitable embodiment is described hereinbelow in connection with FIG. 1.

Mechanical penetration of the relevant element between the electrode elements can only take place if the precipitator in question, i.e. a precipitator formed of high-resistance or dissipative material according to WO97/46322, is designed with strings of glue on only one side. Laboratory tests have shown that an embodiment of a precipitator of this kind designed with strings of glue and with a relatively large diameter causes problems. This is due to the electrostatic forces between adjacent electrode elements (strips), these electrostatic forces urging the adjacent electrodes towards one another. It should be noted that the distance between the respective electrode elements is in the region of between 0.5 and 2 mm, which means that even a very small change in the mechanical stability would have a negative effect on the ability of the precipitator to maintain high and constant efficiency.

In the case of the board material having a thickness of approximately 0.4 mm used in the laboratory tests, the problem with electrostatic forces and their effect on the stability of the precipitator was already encountered with diameters greater than approximately 50 cm and of course increased as the diameter of the precipitator increased, it being specified in the aim given by way of a non-limiting example that precipitators of this kind can have a diameter within the range of 100 cm to 150 cm. Laboratory tests have shown that one method of maintaining mechanical stability given the distance between the respective strip electrodes is to locate the strings of glue on one side of the precipitator and in the area of the periphery very close to each other. It was also found that it is necessary to glue the precipitator to a holder in the form of a spoke wheel in order to achieve the abovementioned mechanical stability. According to the present invention, the maximum distance between adjacent strings of glue or similar measures on the periphery of the precipitator should not exceed 5 cm and preferably should not exceed 3 cm. This generally applies irrespective of the diameter of the precipitator.

The proposed embodiment of a cleaning device for the precipitator as designed hereinabove will be described in connection with FIGS. 1-3.

Figure 1:
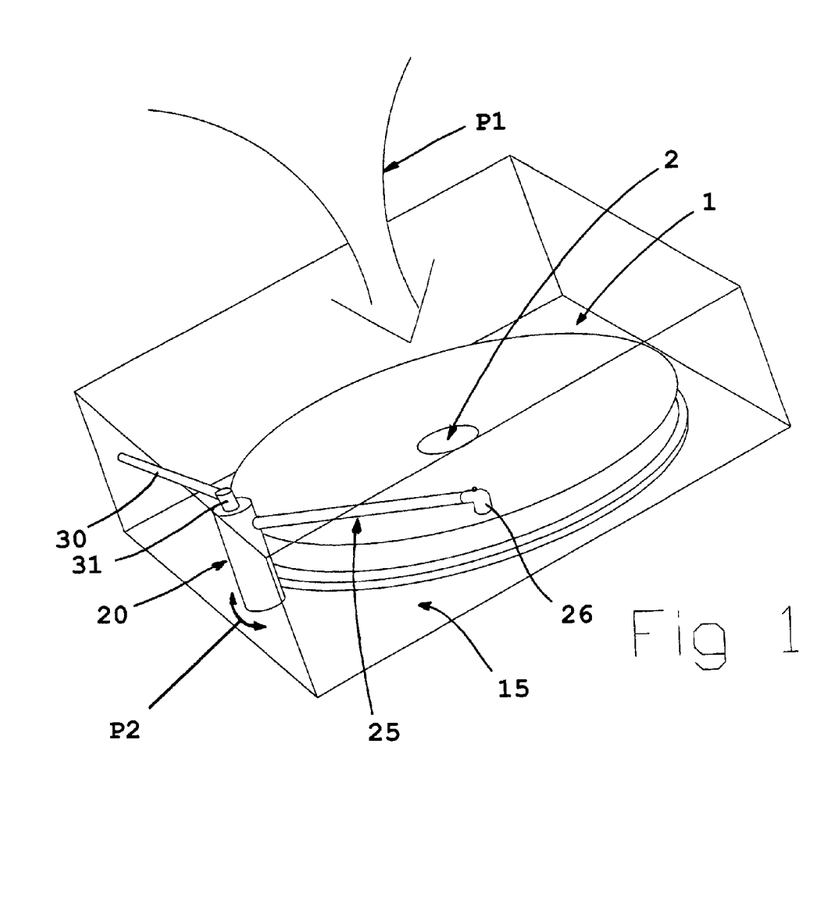
FIG. 1 is a schematic perspective view of a device according to the present invention.

FIG. 1 shows schematically a part of an air-cleaning device mounted around a circular symmetrical precipitator 1 designed according to the same basic principle as the precipitator according to WO97/46322. However, it should be noted in this connection that the precipitator according to the present invention can only be provided with strings of glue on one side and that the precipitator according to the present invention is provided with a stabilising frame 3 (see FIG. 3) including a central portion 5, a number of first spokes 7 extending out from the central portion 5 and a peripheral portion 9 extending around the entire periphery of the precipitator 1. The first spokes 7 are connected to the peripheral portion 9.

Figure 3:
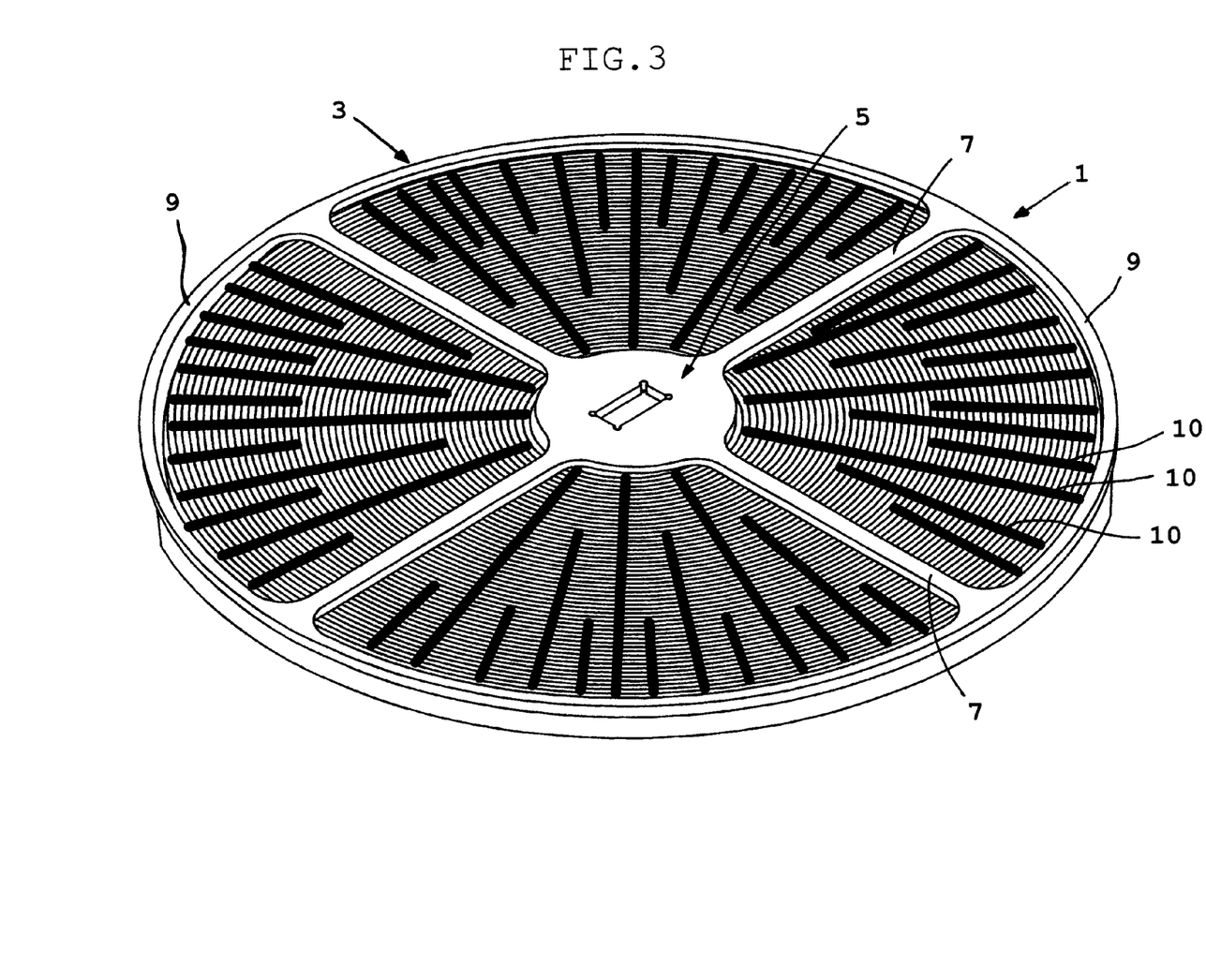
FIG. 3 is a perspective view of a precipitator forming part of the device according to the present invention.

As is evident from FIG. 3, the precipitator 1 is provided with strings 10 of adhesive material, preferably glue, extending radially between the central portion 5 and the peripheral portion 9. As noted hereinabove, these strings 10 of adhesive material should be arranged relatively snugly so as to achieve the required stability of the precipitator 1. The strings 10 may also be of varying radial extent. The stabilising frame 3 and the strings 10 together provide good mechanical stability of the precipitator according to the present invention. It should be noted in this connection that the precipitator 1 does not have strings of adhesive material on the side directed away from the viewer.

The precipitator 1 according to the present invention is supported by a supporting element 15 and the precipitator 1 sits with its centre portion 2 over the centre of the supporting element 15. The supporting element 15 includes a number of other spokes (not shown) extending from the centre of the supporting element 15 out to a peripheral part of the supporting element 15, this peripheral part of the supporting element 15 supporting a peripheral part of the precipitator 1 according to the present invention.

A drive member, preferably an electric motor (not shown), is arranged in the region of the centre of the supporting element 15, on the side of the supporting element 15 directed away from the precipitator 1. The electric motor is provided with an axle passing through the centre of the supporting element 15 and the axle is connected to the centre portion 2 of the precipitator 1 in such a manner that, when the axle of the electric motor rotates, the precipitator 1 is also rotated relative to the supporting element 15, the centre of the centre portion 2 forming the centre of rotation of the precipitator 1. The axle of the electric motor can rotate in any desired direction.

Figure 2:
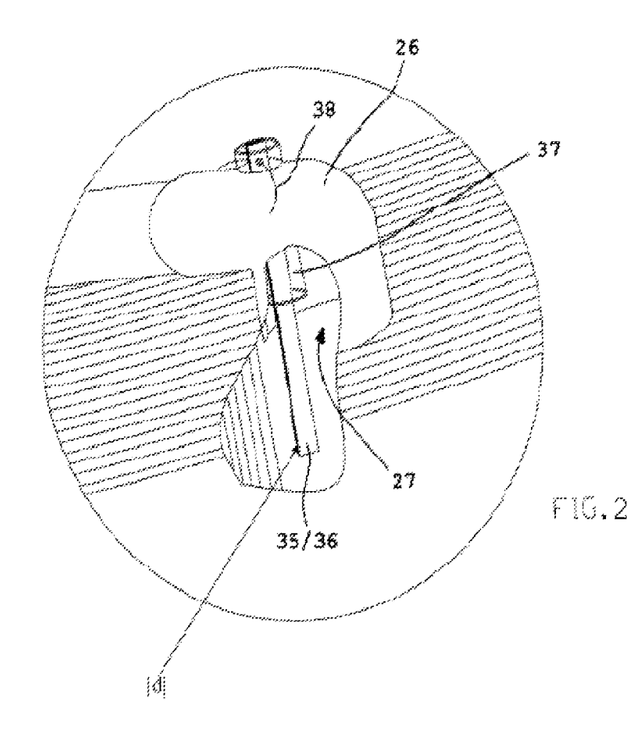
FIG. 2 is a schematic view of a nozzle forming part of the device according to FIG. 1.

Air is conveyed through the precipitator 1 in the normal way, conveying being effected with the aid of a fan not shown in FIG. 1 or FIG. 2. Air is conveyed through the precipitator 1 in the direction of the arrow P1 in FIG. 1. This presupposes that the electrostatic charging of particles takes place upstream of the precipitator as viewed in the direction of the air flow therethrough. This takes place in a hitherto known manner. Both electrodes of the precipitator 1, i.e. both paper strips making up the precipitator 1, are connected in a suitable hitherto known manner to the respective poles of a high-voltage source.

FIG. 1 shows an oblong holder 20 arranged adjacent to the precipitator 1 and the supporting element 15, the longitudinal direction of the holder 20 being transverse to the main plane of the supporting element 15. The holder 20 is mounted adjacent to the supporting element 15 in a suitable manner, e.g. by means of a bearing arrangement, so that the holder 20 can rotate freely in any desired direction about its own longitudinal axis. This is indicated by the double-headed arrow P2 in FIG. 1. A first tube 25 provided with a first right-angled bend 26 and the free end of which is designed as a nozzle 27 (see FIG. 2) extends from the holder 20. The opening of the nozzle 27 is situated snug against the inlet area of the precipitator 1 and the plane defined by the opening of the nozzle 27 is preferably parallel to the plane defined by the inlet area of the precipitator 1. A first air flow channel 30 in the holder 20 connects the first tube 25 to a first tube connection 31 to an external vacuum cleaner not shown in FIG. 1. The connection 31 is rotatably mounted in the holder 20 and therefore does not prevent the holder 20 from rotating about its own longitudinal axis.

The design of the nozzle 27 can be seen most clearly in FIG. 2. Two planar strip-shaped elements 35/36 arranged separately from one another are situated in the first right-angled bend 26. The elements 35/36 are mounted in a tube 37. The strip-shaped elements 35/36 are mounted in the tube 37 via a wire 38 extending through holes formed partly in the upper end of the tube 37 and partly in the upper ends of each of the strip-shaped elements 35/36. By mounting the strip-shaped elements 35/36 in this manner, they can be arranged at a distance from one another corresponding to the thickness of the electrodes, i.e. the paper strips. The holes in the strip-shaped elements 35/36 are so large that the strip-shaped elements 35/36 can be inclined relative to the wire 38. The dimensions of the elements 35/36 are such that they can rotate freely in the tube 37. As shown by FIG. 2, the elements 35/36 penetrate into two adjacent gaps of the precipitator 1, i.e. the spaces between adjacent electrodes. It should be noted in this connection that the nozzle 27 is arranged on the side of the precipitator 1 that does not have strings of adhesive material.

The elements 35/36 have a longitudinal extension corresponding to the greater part of the thickness of the precipitator 1. The elements 35/36 have an inherent rigidity which is important for the operation of the elements 35/36. By virtue of the helical gaps of the precipitator 1, each displacement of the precipitator corresponds to 360°, i.e. one turn, a radial displacement of the nozzle 27 corresponding to twice the spacing plus the thickness of the electrode elements. Depending on the direction of rotation of the precipitator 1, the nozzle 27 is displaced either towards the centre of the precipitator 1 or towards its periphery. This of course requires control equipment controlling both the cleaning interval and the direction of rotation of the precipitator 1. As a result of the fact that the elements 35/36 are located between the electrode elements, the dust particles collected on the electrodes are removed during the cleaning process and these dust particles are conveyed by the air flow to the collecting means of the vacuum cleaner, usually a bag. An important property of the elements 35/36 is therefore that they have an inherent rigidity.

According to the present invention, there is of course nothing to prevent the elements 35/36 from being designed as thin bars or simply as a brush which penetrates into the gap between the electrodes. In the latter case, one part of the brush may be designed to penetrate to a lesser extent into the gap "d" and one part to a greater extent. However, it is essential that the elements 35/36 are located in both air flow channels of the precipitator 1, i.e. in the two spaces between adjacent electrode elements of the precipitator 1.

Figure 4:
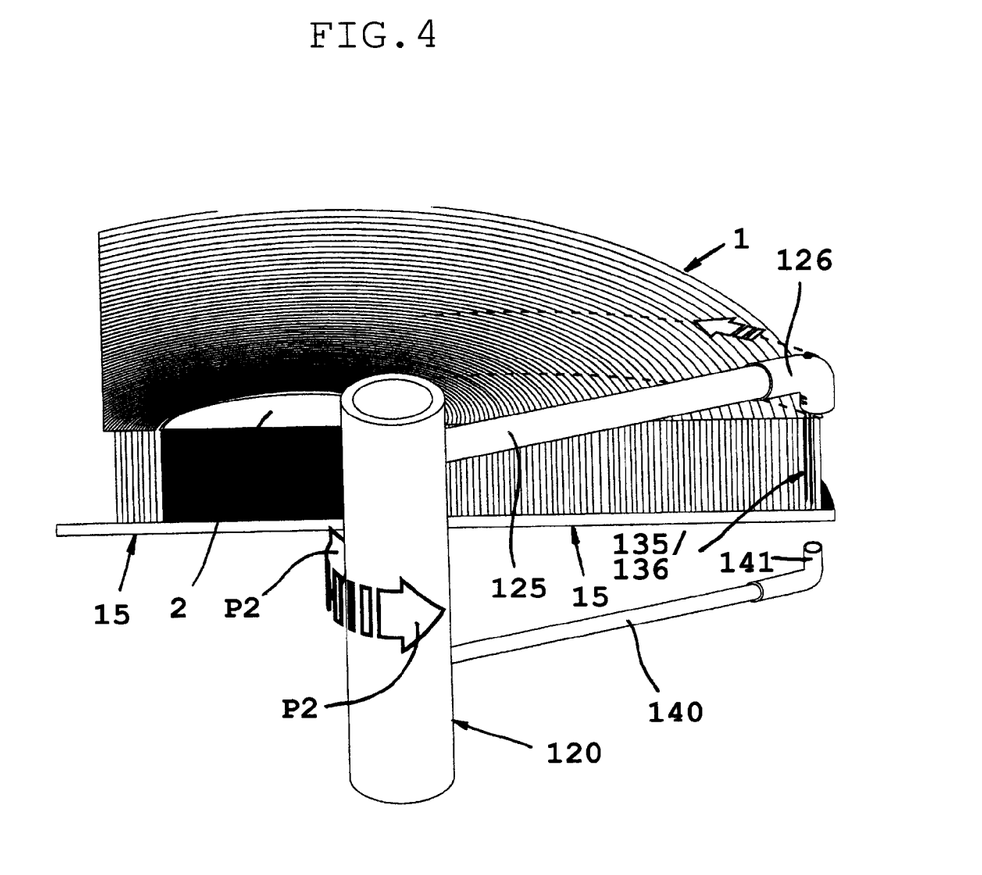
FIG. 4 is a schematic perspective view of an alternative embodiment of a device according to the present invention with a vacuum cleaner and part of a precipitator to be accommodated by the vacuum cleaner.

FIG. 4 shows schematically a part of an air-cleaning device in connection with a circular symmetrical precipitator 1 which is in principle identical to the precipitator 1 described hereinabove. For this reason, both precipitators 1 are designated by the same reference numeral.

In the alternative embodiment of the device according to the present invention shown in FIGS. 4 and 5, the precipitator 1 is supported by a supporting element 15 corresponding in principle to the supporting element 15 described hereinabove. For this reason, both supporting elements are designated by the same reference numeral 15.

Figure 5:
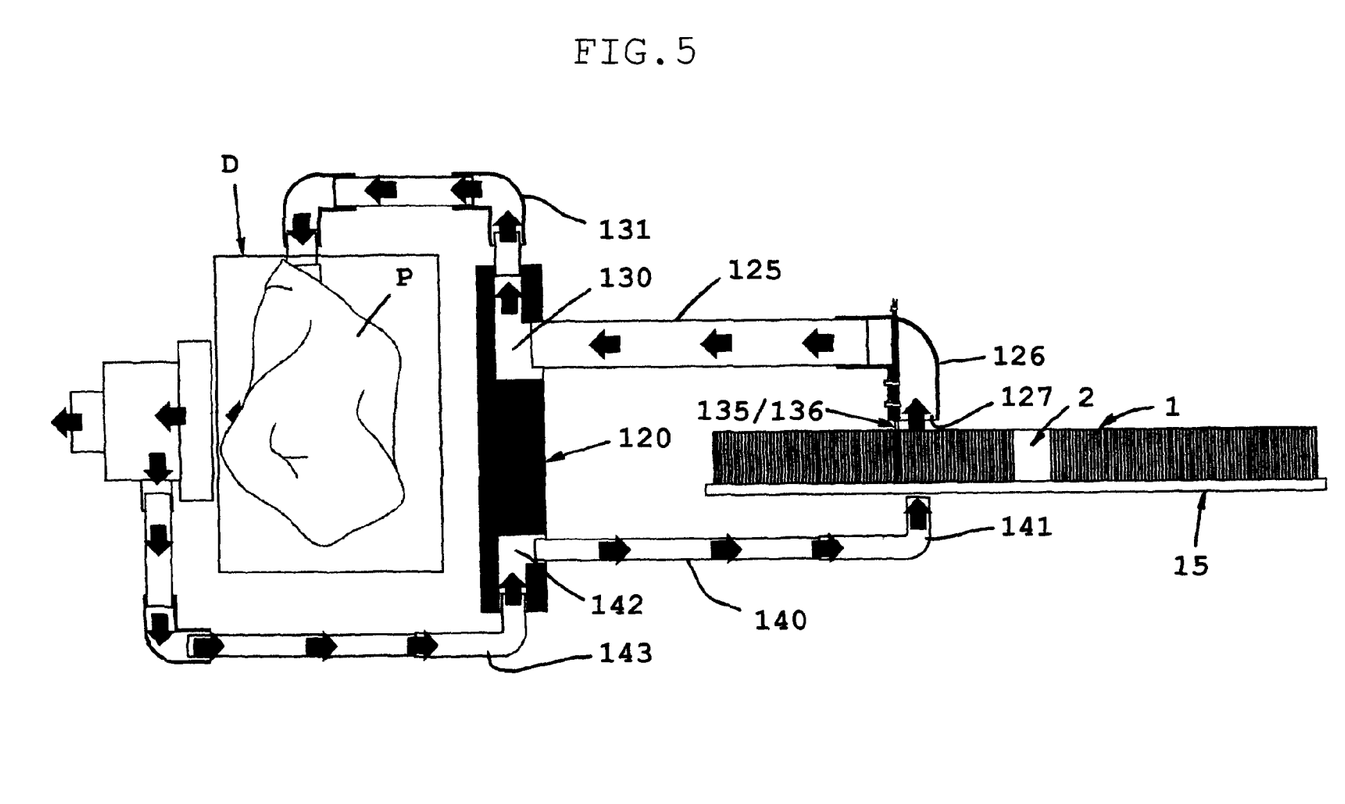
FIG. 5 is a schematic view showing the air flow through the vacuum cleaner.

Air is conveyed through the precipitator 1 in the normal way, conveying being effected with the aid of a fan not shown in FIG. 4 or FIG. 5. Air is conveyed through the precipitator in the downward direction in FIG. 5. This presupposes that the electrostatic charging of particles takes place upstream of the precipitator as viewed in the direction of the air flow therethrough. This takes place in a hitherto known manner. Both electrodes of the precipitator 1, i.e. both paper strips making up the precipitator 1, are connected in a suitable hitherto known manner to the respective poles of a high-voltage source.

FIGS. 4 and 5 show an oblong holder 120 arranged adjacent to the precipitator 1 and the supporting element 15, the longitudinal direction of the holder 120 being transverse to the main plane of the supporting element 15. The holder 120 is mounted adjacent to the supporting element 15 in a suitable manner, e.g. by means of a bearing arrangement, so that the holder 120 can rotate freely in any desired direction about its own longitudinal axis. This is indicated by the double-headed arrow P2 in FIG. 4. A first tube 125 provided with a first right-angled bend 126 and the free end of which forms a nozzle 127 extends from the holder 120. The opening of the nozzle 127 is situated snug against the inlet area of the precipitator 1 and the plane defined by the opening of the nozzle 127 is preferably parallel to the plane defined by the inlet area of the precipitator 1. A first air flow channel 130, see FIG. 5, in the holder 120 connects the first tube 125 to a first tube connection 131 to an external vacuum cleaner D. The connection 131 is rotatably mounted in the holder 120 and therefore does not prevent the holder 120 from rotating about its own longitudinal axis.

The design of the nozzle 127 can be seen most clearly in FIG. 5. Two planar strip-shaped elements 135/136 arranged adjacent to one another are situated in the first right-angled bend 126. The elements 135/136 are mounted in a tube. The elements 135/136 are preferably suspended in a corresponding manner to that of the elements 35/36, i.e. a wire extends through holes in the upper ends of the elements 135/136. The elements 135/136 can thus be arranged at a distance from one another corresponding to the thickness of the electrodes, i.e. the paper strips. The dimensions of the elements 135/136 are such that they can rotate freely in the tube. As shown by FIGS. 4 and 5, the elements 135/136 penetrate into two adjacent gaps of the precipitator 1, i.e. the spaces between adjacent electrodes. The elements 135/136 thus have an extension corresponding to the greater part of the thickness of the precipitator 1. It is also important in this case that the elements 135/136 are inherently rigid. By virtue of the helical gaps of the precipitator 1, each displacement of the precipitator corresponds to 360°, i.e. one turn, a radial displacement of the nozzle 127 corresponding to twice the spacing plus the thickness of the electrode elements. Depending on the direction of rotation of the precipitator 1, the nozzle 127 is displaced either towards the centre of the precipitator 1 or towards its periphery. This of course requires control equipment controlling both the cleaning interval and the direction of rotation of the precipitator 1. As a result of the fact that the elements 135/136 are located between the electrode elements, the dust particles collected on the electrodes are removed during the cleaning process and these dust particles are conveyed by the air flow to the collecting means of the vacuum cleaner, usually a bag.

According to the present invention, there is of course nothing to prevent the elements 135/136 from being designed as thin bars or simply as a brush which penetrates into the gap between the electrodes. In the latter case, one part of the brush may be designed to penetrate to a lesser extent into the gap "d" and one part to a greater extent. However, it is essential that the elements 135/136 are located in both air flow channels of the precipitator 1, i.e. in the two spaces between adjacent electrode elements of the precipitator 1. As will be clear from FIGS. 4 and 5, the embodiment of the device according to the present invention shown there is also provided with a second tube 140 connected by means of one end to the holder 120. A second right-angled bend 141 is provided at the other end of the second tube 140 and the free end defined there is situated adjacent to the underside of the supporting element 15. This ensures that the nozzle 127 and the free end of the second bend 141 are situated one immediately in front of the other on opposite sides of the precipitator 1. A second air flow channel 142 of the holder 120 connects the second tube 140 to a second tube connection 143 connected to the blower outlet of the vacuum cleaner D.

The device described according to FIGS. 4 and 5 operates as follows. When cleaning/vacuum cleaning of the precipitator is to be carried out, the elements 135/136 are preferably located adjacent to the centre of the precipitator 1 or alternatively adjacent to the periphery of the precipitator 1. The precipitator 1 is then rotated by starting the electric motor. The direction of rotation of the precipitator 1 is selected in such a manner that the elements 135/136 are displaced in the desired direction, i.e. from the periphery and in towards the centre or from the centre and out towards the periphery. This takes place automatically when the precipitator 1 rotates as the strip-shaped electrode elements are helical and when the first and second tubes 125, 140 are connected to the rotatable holder 120. When the elements 135/136 move relative to/along the electrode elements of the precipitator 1, they free dust particles and other dirt adhering to the electrode elements in a mechanical manner. By activating the vacuum cleaner, a suction effect is created in the nozzle 127 and the freed dust/dirt is sucked into the first tube 125, passes via the holder 120 and is collected in the bag P of the vacuum cleaner P. At the same time, air is fed from the blower outlet of the vacuum cleaner D to the underside of the precipitator 1 and this air passes through the precipitator 1 while it is helping to remove dust/dirt from the precipitator 1. As the nozzle 127 and the outlet end of the second tube 140 are situated one immediately in front of the other, effective cleaning/vacuum cleaning is firmly established on both sides of the precipitator 1. Arrows in FIG. 5 show how the air circulates through the precipitator 1 and the vacuum cleaner D. It should be noted in this connection that the volume of air sucked into the nozzle 127 per unit of time will be greater than the volume of air blown out through the second bend 141 of the second tube 140 per unit of time.

Figure 6:
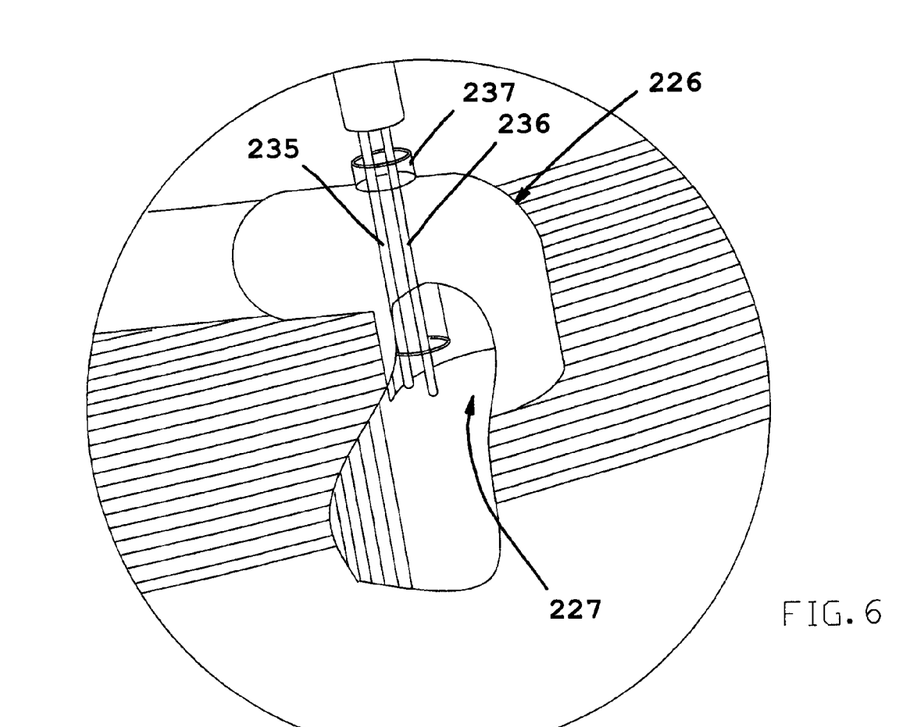
FIG. 6 is a schematic perspective view of the nozzle and adjoining parts of an alternative embodiment of the device according to the present invention.

FIG. 6 shows a further alternative embodiment of a nozzle 227 forming part of a device according to the present invention. As will be clear from FIG. 6, the alternative embodiment includes a first tube 237 arranged in the first right-angled bend 226 and receiving two penetrating elements/second tubes 235/236 having a substantially smaller diameter than the first tube 237. The diameter of the second tubes 235/236 should be such that the second tubes 235/236 can penetrate into the gaps between adjacent electrode elements of the precipitator 1. The nozzle 227 can thus be displaced in the radial direction of the precipitator 1 in a manner corresponding to that described hereinabove. It is important that the second tubes 235/236 are inherently rigid so as to ensure the displacement of the nozzle 227. The penetrating elements/second tubes 235/236 do not need to penetrate into the gaps to the same extent as the strip-shaped elements 35/36; 135/136 described hereinabove. The extent of the penetration simply has to be sufficient to ensure the displacement of the nozzle 227 over the inlet area of the precipitator 1.

The second tubes 235/236 are connected to a compressed air source, e.g. a compressor (not shown). An air trap (not shown), e.g. in the form of a disc or the like, is arranged on the underside of the precipitator 1. An embodiment with a nozzle 227 according to FIG. 6 operates in such a manner that compressed air is fed via the second tubes 235/236 to the gaps between adjacent electrode elements, the compressed air fed in this manner "bumps" against the air trap and is sucked into the nozzle 227 coupled to a vacuum cleaner. The compressed air fed through the second tubes 235/236 frees dirt and other particles from the electrode elements, the freed dirt/particles being sucked into the nozzle 227 connected to a vacuum cleaner (not shown).

Figure 7:
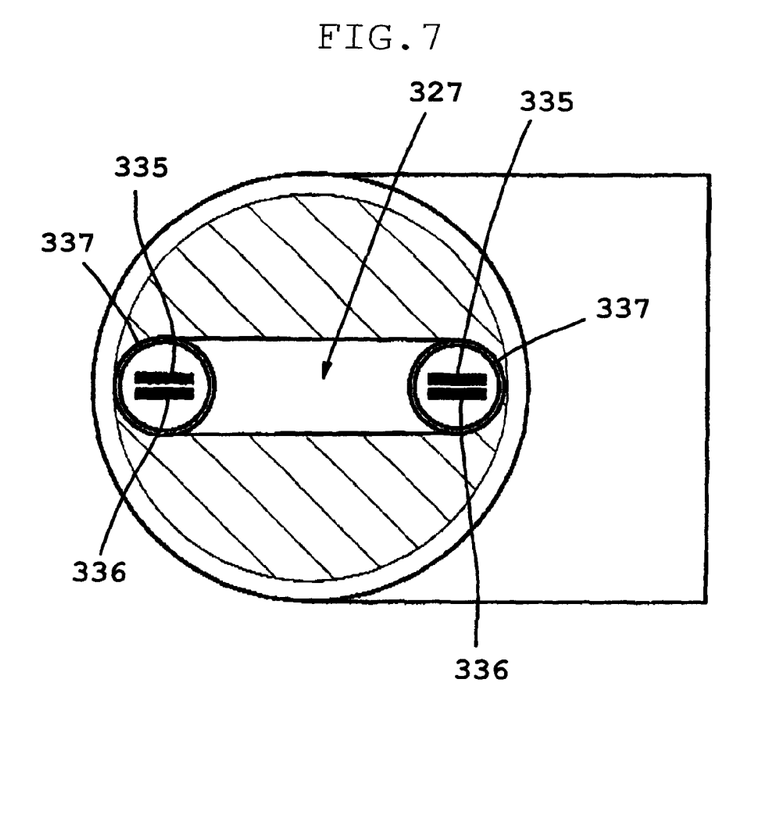
FIG. 7 is a plan view of the nozzle of another alternative embodiment of the device according to the present invention.

FIG. 7 shows an embodiment of a nozzle 327 in which double sets of elements 335/336 penetrating into the gaps between adjacent electrode elements are provided, i.e. two pairs of elements 335/336 are arranged in the nozzle 327. Each pair of elements 335/336 is arranged in a first tube 337. The elements 335/336 are inherently rigid and are suspended in a suitable manner, e.g. in any of the ways described hereinabove. The area of the nozzle 327 is delimited in that the opening on the first right-angled bend 326 is partly blocked, i.e. according to the embodiment shown, only an oblong opening remains, extending between the two first tubes 337. By virtue of this reduced inlet area, the vacuum cleaner (not shown) connected to the nozzle 327 produces an improved suction effect, which in turn means that the freed particles are removed from the precipitator to a greater extent.

FEASIBLE MODIFICATIONS OF THE INVENTION

In the embodiments described hereinabove, the inlet side of the precipitator is situated on the side on which the precipitator does not have strings of adhesive material. However, laboratory tests have shown that the inlet side of the precipitator can be situated on the side on which the precipitator is provided with strings of adhesive material. This of course presupposes that the charging of the particles takes place upstream of the precipitator as viewed in the direction of the air flow through the precipitator.

The vacuum cleaner D shown in FIG. 5 does not have to be a permanent installation connected to the precipitator 1. It is thus conceivable for the vacuum cleaner to be designed as a mobile unit transferred between precipitators that need to be cleaned.

According to the present invention, it is also conceivable to use a compressor instead of the blower outlet of the vacuum cleaner to feed air to the underside of the precipitator 1. The compressor is thus connected in a suitable manner to the second tube connection 143, see FIG. 5.

It should be noted in this connection that the components that must form part of the device according to the present invention are the nozzle 27; 127; 227 and connecting tubes that can be coupled to a vacuum cleaner. In the embodiment according to FIGS. 4 and 5, means for feeding air to the underside of the precipitator 1 must moreover be provided, these means normally consisting of tubes 140, 141 and tube connections that can be connected to a compressed air source, e.g. the blower of a vacuum cleaner or a compressor. The nozzle 127 and the means for feeding air must moreover move synchronously over opposing surfaces of the precipitator.

The precipitator shown in FIG. 3 comprises radial strings 10 of adhesive material, preferably glue. However, it is not necessary for the adhesive material to be applied in the form of radial strings. According to the present invention, it is conceivable for the adhesive material to be applied in the form of circles, spirals or ellipses, etc., this list being given only by way of example. What is important is that the adhesive material/glue is applied between adjacent electrode elements.

With reference to the embodiment according to FIG. 6, i.e. fed compressed air "bumping" against an air trap, it is alternatively conceivable for a vacuum cleaner nozzle to be arranged on the side of the precipitator 1 directed away from the nozzle 227 with the compressed air supply and for the nozzles to be situated one immediately in front of the other.

In the embodiments described hereinabove, two elements penetrating into adjacent gaps are arranged in each first tube in the nozzle. According to this invention, it is conceivable for more than two elements to be arranged in each first tube in the nozzle.

With reference to the embodiments in which vacuum cleaning takes place on the side of the precipitator 1 on which the penetrating elements 35/36 are situated, it is conceivable for some form of brush to be arranged on the opposite side of the precipitator 1. The precipitator 1 should therefore preferably have a thin frame on the side on which the brush is situated, the bristles of the brush reaching in between the electrode elements of the precipitator 1. The brush may be stationary if the precipitator 1 is rotated. The aim of the brush is to free dust from the precipitator 1, after which this freed dust is sucked into the vacuum cleaner nozzle.

The invention claimed is:

1. A device in connection with a circular precipitator for a two-stage electrostatic filter, the precipitator being formed of at least two strip-shaped electrode elements wound around a centrally arranged bobbin and the electrode elements being arranged at a distance "d" from one another so that gaps are formed between the electrode elements, the device comprising:
    means for rotating the precipitator about its center axis; and
    a vacuum cleaner nozzle arranged on one side of the precipitator, the vacuum cleaner nozzle being situated in the immediate vicinity of the precipitator, the vacuum cleaner nozzle being provided with at least two elements designed to penetrate into the gaps between adjacent electrode elements of the precipitator.

2. The device according to claim 1, wherein the elements are inherently rigid.

3. The device according to claim 1, wherein the elements are strip-shaped and are rotatable in their longitudinal direction.

4. The device according to claim 2, wherein the elements are suspended from a wire passing through openings in the elements.

5. The device according to claim 1, wherein the elements are tubular and are connected to a compressed air source.

6. The device according to claim 1, wherein the vacuum cleaner nozzle has a reduced area.

7. The device according to claim 1, further comprising means for blowing air through the precipitator from the side directed away from the vacuum cleaner nozzle to the side on which the vacuum cleaner nozzle is situated, the means being situated immediately in front of the vacuum cleaner nozzle on the opposite side of the precipitator.

8. The device according to claim 7, wherein, in order to blow air through the precipitator, the means include a second tube connected to the blower outlet of the vacuum cleaner.

9. The device according to claim 2, wherein the elements are strip-shaped and are rotatable in their longitudinal direction.

10. The device according to claim 2, wherein the elements are tubular and are connected to a compressed air source.

* * * * *